(12) United States Patent
Kim et al.

(10) Patent No.: US 12,179,533 B1
(45) Date of Patent: Dec. 31, 2024

(54) STABILIZER BAR ASSEMBLY AND VEHICLE INCLUDING THE SAME

(71) Applicants: Hyundai Motor Company, Seoul (KR); Kia Corporation, Seoul (KR); Daewon Kang Up Co., Ltd., Cheonan-si (KR)

(72) Inventors: Jae Hun Kim, Hwaseong-si (KR); Yong Jae Woo, Hwaseong-si (KR); Won Yeong Kim, Incheon (KR)

(73) Assignees: Hyundai Motor Company, Seoul (KR); Kia Corporation, Seoul (KR); Daewon Kang Up Co., Ltd., Cheonan-si (KR)

( * ) Notice: Subject to any disclaimer, the term of this patent is extended or adjusted under 35 U.S.C. 154(b) by 0 days.

(21) Appl. No.: 18/596,073

(22) Filed: Mar. 5, 2024

(30) Foreign Application Priority Data

Nov. 2, 2023 (KR) .................. 10-2023-0149782

(51) Int. Cl.
| | | |
|---|---|---|
| *B60G 11/18* | (2006.01) | |
| *B60G 21/02* | (2006.01) | |
| *B60G 21/055* | (2006.01) | |
| *F16F 1/14* | (2006.01) | |

(52) U.S. Cl.
CPC .......... *B60G 11/184* (2013.01); *B60G 21/026* (2013.01); *B60G 21/055* (2013.01); *F16F 1/145* (2013.01); *B60G 2202/135* (2013.01); *B60G 2202/1351* (2013.01); *B60G 2204/82* (2013.01); *B60G 2206/427* (2013.01)

(58) Field of Classification Search
CPC .... B60G 11/184; B60G 11/18; B60G 21/026; B60G 21/02; B60G 21/0558; B60G 21/0553; B60G 21/055; B60G 2202/135; B60G 2202/1351; B60G 2204/82; B60G 2204/83; B60G 2204/8302; B60G 2206/427; F16F 15/1245; F16F 1/14; F16F 1/145
USPC ......... 280/124.106, 5.511, 124.152; 267/277
See application file for complete search history.

(56) References Cited

U.S. PATENT DOCUMENTS

| | | | | |
|---|---|---|---|---|
| 6,022,030 | A * | 2/2000 | Fehring | B60G 21/0553 280/5.511 |
| 2017/0106714 | A1* | 4/2017 | Yang | B60G 21/055 |
| 2020/0070617 | A1* | 3/2020 | Lim | B60G 21/0553 |
| 2020/0376919 | A1* | 12/2020 | Lim | B60G 21/055 |

FOREIGN PATENT DOCUMENTS

| | | | |
|---|---|---|---|
| DE | 102011052275 A1 * | 3/2012 | ......... B60G 21/0555 |
| KR | 20210157082 A * | 12/2021 | |
| KR | 20240066811 A | 5/2024 | |

* cited by examiner

*Primary Examiner* — Keith J Frisby
(74) *Attorney, Agent, or Firm* — Slater Matsil, LLP (57) ABSTRACT

A stabilizer bar assembly may include left and right bars, an outer cylinder member connected to one of the left bar and the right bar, an inner cylinder member provided inside the outer cylinder member to enable relative rotation with the outer cylinder member, and connected to the other one of the left bar and the right bar, and a torsion spring providing rotational stiffness to the inner cylinder member and the outer cylinder, which rotate relatively.

18 Claims, 11 Drawing Sheets

STABILIZER BAR ASSEMBLY AND VEHICLE INCLUDING THE SAME

CROSS-REFERENCE TO RELATED APPLICATIONS

This application claims benefit of priority to Korean Patent Application No. 10-2023-0149782 filed on Nov. 2, 2023 in the Korean Intellectual Property Office, the disclosure of which is incorporated herein by reference in its entirety.

TECHNICAL FIELD

The present disclosure relates to a stabilizer bar assembly for a vehicle.

BACKGROUND

A vehicle suspension system is a device preventing damage to a vehicle body or cargo and improving ride comfort by preventing vibrations or shocks received from a road surface when driving from being directly transmitted to the vehicle body by connecting an axle and the vehicle body. The suspension system includes a stabilizer bar promoting driving stability by reducing a rolling phenomenon occurring in the vehicle body while driving.

The stabilizer bar is installed across a vehicle body in a width direction thereof, both ends are coupled to a suspension arm (lower arm), and a selected, set, or predetermined portion between both ends is installed to be coupled to a chassis frame (subframe) through a bushing.

A conventional stabilizer bar has a fixed roll stiffness value to suit the general performance of the vehicle, making it difficult to effectively respond to changes in load values input during vehicle behavior while driving.

In other words, when roll stiffness is increased by making the stabilizer bar harder, turning stability is improved, but there may be a disadvantage in stability and ride comfort when driving straight, and conversely, when the roll stiffness is decreased by making the stabilizer bar softer, which is advantageous for ride comfort when driving straight, but is disadvantageous for turning stability.

To solve this problem, a system known as active roll stabilization (ARS) or active roll control (ARC) that can control roll stiffness in real time using sensors, actuators, and controllers, has been developed, but these systems have a disadvantage of being difficult to be applied widely due to high costs.

SUMMARY

The present disclosure relates to a stabilizer bar assembly and a vehicle including the same, and more particularly, to a stabilizer bar assembly having a variable roll stiffness value to effectively respond to various types of rolling phenomena occurring during driving.

To solve at least some of the above-described problems, some embodiments of the present disclosure provide a stabilizer bar assembly for a vehicle having a variable roll stiffness value to effectively respond to various types of roll phenomenon that can occur during driving by using only mechanical parts without using sensors or actuators. Some embodiments of the present disclosure can help improve turning stability, improve safety when driving straight, and improve ride comfort through the stabilizer bar assembly.

According to an embodiment of the present disclosure, a stabilizer bar assembly may include a left bar and a right bar, an outer cylinder member connected to one of the left bar and the right bar, an inner cylinder member provided inside the outer cylinder member to enable relative rotation with the outer cylinder member and connected to the other one of the left bar and the right bar, and a torsion spring providing rotational stiffness to the inner cylinder member and the outer cylinder member, which can rotate relatively.

One end of the torsion spring may be directly or indirectly coupled to the outer cylinder member, and the other end of the torsion spring may be directly or indirectly fixed to the inner cylinder member.

The stabilizer bar assembly may further include a shaft fixed to the inner cylinder member, and the other end of the torsion spring may be fixed to the shaft.

The stabilizer bar assembly may further include a compression sheet fixed to the outer cylinder member, and one end of the torsion spring may be pressed by the compression sheet.

One or more stoppers may protrude inwardly in an inner diameter of the outer cylinder member, and a stopper groove into which the stopper is inserted may be provided in an outer diameter of the inner cylinder member.

The stopper can be caught by the stopper groove due to the relative rotation of the inner cylinder member and the outer cylinder member, and a rotational force may be transmitted between the outer cylinder member and the inner cylinder member.

A selected, set, or predetermined gap may be formed between one side surface of the stopper and one side surface of the stopper groove in a rotational direction of the outer cylinder member.

The stabilizer bar assembly may further include a shaft fixed to the inner cylinder member and to which one end of the torsion spring is fixed, and a compression sheet fixed to the outer cylinder member and by which the other end of the torsion spring is pressed.

The shaft may be provided to have a length in a longitudinal direction of the inner cylinder member, and the torsion spring may be inserted into the shaft and an inner end, which is one end of the torsion spring that may be fixed to the shaft.

The plurality of torsion springs may be sequentially inserted in a longitudinal direction of the shaft, an outer end, which is the other end of the torsion spring that may intersect and expand in left and right directions to form a space therebetween in the longitudinal direction, and a portion of the compression sheet may be inserted into the space therebetween to press the other end of the torsion spring.

The compression sheet may have a compression protrusion protruding into the space therebetween.

As the torsion spring is compressed and tensioned when the outer cylinder member rotates, primary roll stiffness due to elasticity may be generated.

After the primary roll stiffness is generated, when the rotation is transmitted to the inner cylinder member through continued rotation of the outer cylinder member, secondary roll stiffness, greater than the primary roll stiffness may be implemented by torsion of the left and right bars.

A stopper groove into which a stopper of the outer cylinder member can be inserted can be provided in an outer diameter of the inner cylinder member, and as the torsion spring is compressed and tensioned until the outer cylinder member and the inner cylinder member rotate relatively with each other and side surfaces of the stopper and the stopper groove contact each other, primary roll stiffness due to elasticity may be generated.

After the primary roll stiffness is generated, when one side surface of the stopper and one side surface of the stopper groove contact each other through continued rotation of the outer cylinder member, the rotation can be transmitted to the inner cylinder member, so that secondary roll stiffness, greater than the primary roll stiffness may be implemented by the torsion of the left bar and the right bar.

BRIEF DESCRIPTION OF THE DRAWINGS

The above and other features, and advantages of the present disclosure can be more clearly understood from the following detailed description, taken in conjunction with the accompanying drawings, in which.

DETAILED DESCRIPTION OF ILLUSTRATIVE EMBODIMENTS

Because the present disclosure may have various changes and may have various example embodiments of the present disclosure, specific embodiments may be illustrated in the drawings and described in detail. However, this is not intended to necessarily limit the present disclosure to specific embodiments, it can be understood to include all modifications, equivalents, and substitutes included in the spirit and technical scopes of the present disclosure.

Terms such as "first," "second," and the like, may be used to describe various elements, but the elements are not necessarily limited by such terms. Such terms may be used merely for distinguishing one component from another. For example, without departing from the scope of the present disclosure, a first component may be referred to as a second component, and similarly, a second component may also be referred to as a first component. The term "and/or" may include a combination of a plurality of related listed items or any of the plurality of related listed items.

Terms used in the present application may be only used to describe specific embodiments, and are not intended to necessarily limit the present disclosure. A singular expression may include a plural expression, unless the context clearly dictates otherwise. In the present disclosure, it can be understood that terms such as "include," "comprise," or "have" are intended to designate that features, numerals, steps, operations, components, parts, or combination thereof, described in the present disclosure exists, and such terms do not preclude the existence or addition of numbers, steps, operations, components, parts, or combinations thereof.

Unless defined otherwise, terms used herein, including technical or scientific terms, can have a same meaning as that which can commonly understood by one of ordinary skill in the art to which the present disclosure pertains. Terms such as those defined in a commonly used dictionary can be interpreted as having a meaning consistent with the meaning in the context of the related art.

Hereinafter, some embodiments of the present disclosure will be described in more detail with reference to the accompanying drawings.

Figure 1:
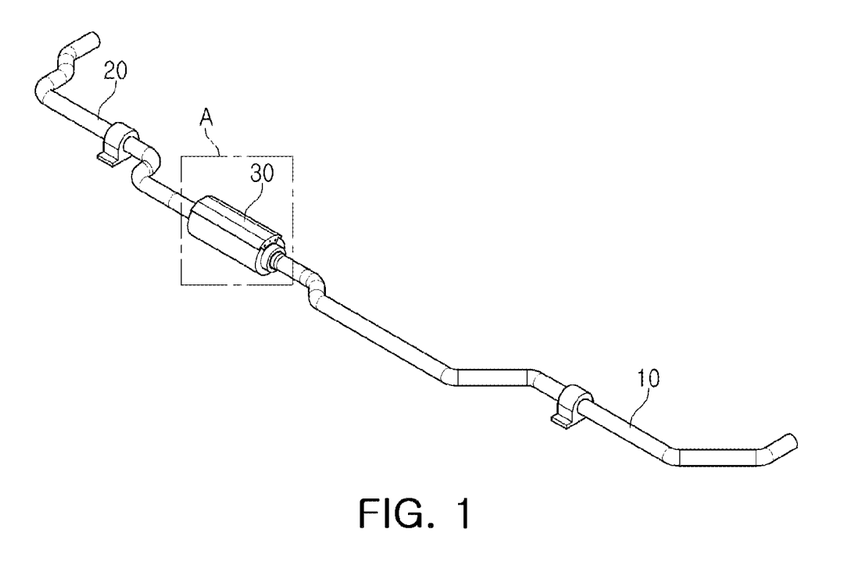
FIG. 1 is a perspective view of a stabilizer bar assembly according to an embodiment of the present disclosure.
Figure 2:
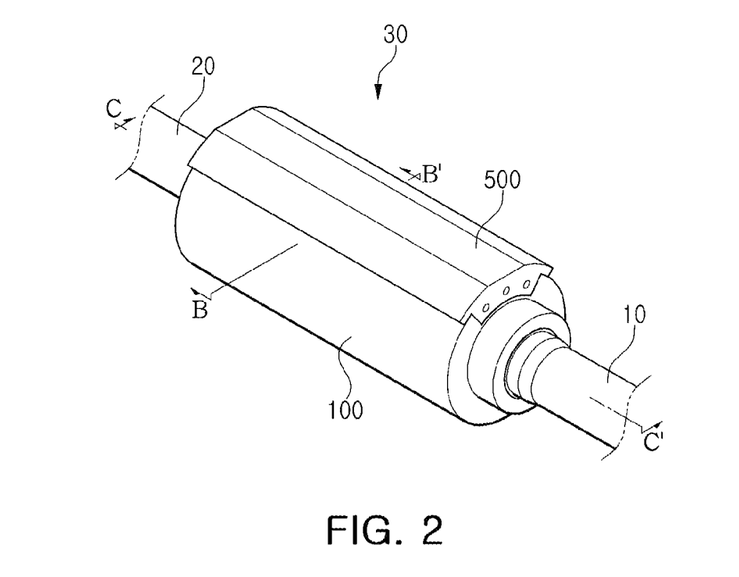
FIG. 2 is an enlarged perspective view of a connection portion (portion 'A' in FIG. 2), which is a part of the stabilizer bar assembly according to an embodiment of the present disclosure.
Figure 3:
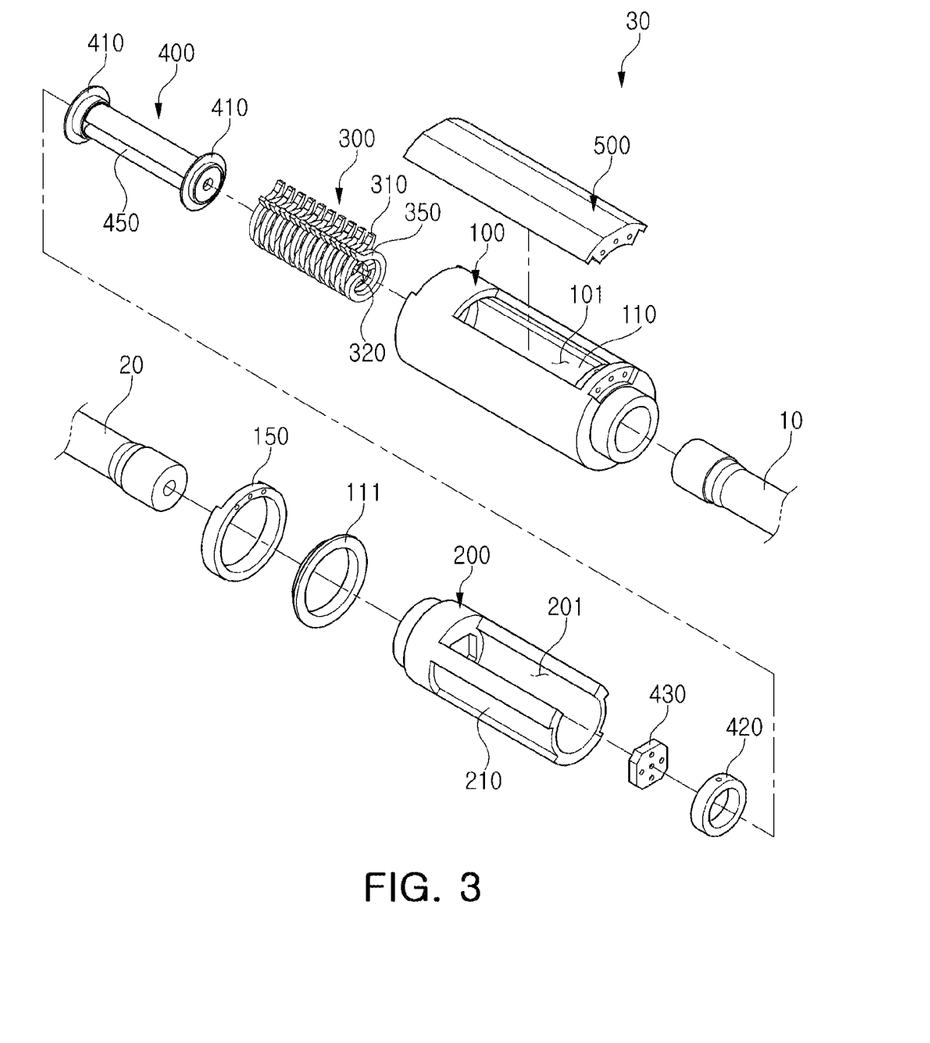
FIG. 3 is an exploded perspective view of a connection portion, which is a part of the stabilizer bar assembly according to an embodiment of the present disclosure.

Referring to FIG. 1, a stabilizer bar assembly for a vehicle according to an embodiment of the present disclosure may include a left bar 10 and a right bar 20 respectively connected to left and right suspension components of a vehicle, and a connection mechanism 30 connecting the separated left bar 10 and right bar 20, and exhibiting variable roll stiffness with respect to a rolling phenomenon that can occur in a vehicle body during driving.

Referring to FIGS. 2 to 6J, a stabilizer bar of a vehicle in an embodiment may be composed of a left bar 10 and a right bar 20, separated from each other, and one end of the left bar 10 may be coupled to a suspension arm (e.g., lower arm) of the left wheel of the vehicle, and one end of the right bar 20 may be coupled to a suspension arm (e.g., lower arm) of the right wheel of the vehicle.

The connection mechanism 30 can include an outer cylinder member 100, an inner cylinder member 200, and a torsion spring 300. The torsion spring 300 may be provided as or may include one or a plurality of torsion springs.

In detail, the connection mechanism 30 may include an outer cylinder member 100 coupled to one of the left bar 10 and the right bar 20, an inner cylinder member 200 inserted into the outer cylinder member 100, and that can rotate relatively with the outer cylinder member 100 and coupled to the remaining one bar (10 or 20) not coupled to the outer cylinder member 100, and a torsion spring 300 providing rotational stiffness (torsional stiffness) to the relatively rotating inner cylinder member 200 and the outer cylinder member 100. The torsion spring 300 may be installed between the outer cylinder member 100 and the inner cylinder member 200 and may be compressed and tensioned when the outer cylinder member 100 rotates, thereby implementing roll stiffness of the vehicle due to elasticity.

In the present disclosure, a structure in which the left bar 10 is coupled to the outer cylinder member 100 and the right bar 20 is coupled to the inner cylinder member 200 is shown as an example embodiment, but the present disclosure is not limited thereto, and may be configured in an opposite manner, for example.

The left and right wheels of the vehicle can behave out of phase with each other due to bumps and rebounds, and when the outer cylinder member 100 rotates due to torsion of the left bar 10, the torsion spring 300 can be compressed and tensioned, and primary roll stiffness can be generated by a spring force (elastic force) of the torsion spring 300, which can help improve stability and ride comfort when the vehicle is driven straight, for example.

When the outer cylinder member 100 continues to rotate after the primary roll stiffness is generated by the spring force (elastic force) of the torsion spring 300, the outer cylinder member 100 and the inner cylinder member 200 can be caught and relative rotation can be stopped (compression and tension operations of the torsion spring 300 can be stopped), and the rotation of the outer cylinder member 100 can be transmitted to the inner cylinder member 200, which can cause torsion of the left bar 10 and the right bar 20, thereby implementing secondary roll stiffness greater than the primary roll stiffness, thereby improving turning stability.

In an embodiment of the present disclosure, by using only mechanical parts including the outer cylinder member 100, the inner cylinder member 200, and a plurality of torsion springs 300, variable roll stiffness can be generated in response to various types of roll phenomenon occurring during driving, which may help improve the turning stability of the vehicle, improve safety when the vehicle is driven straight, and improve ride comfort. Compared to the prior art using sensors, actuators, and controllers, an embodiment of the present disclosure can have an advantage of reducing the number of parts and reducing costs, for example.

The connection mechanism 30 of an embodiment may be provided with one or more stoppers 110 to protrude inwardly in an inner diameter of the outer cylinder member 100 to transmit rotational force between the outer cylinder member 100 and the inner cylinder member 200, and a stopper groove 210 into which the stopper 110 can be inserted may be formed in an outer diameter of the inner cylinder member 200.

Figure 4A:
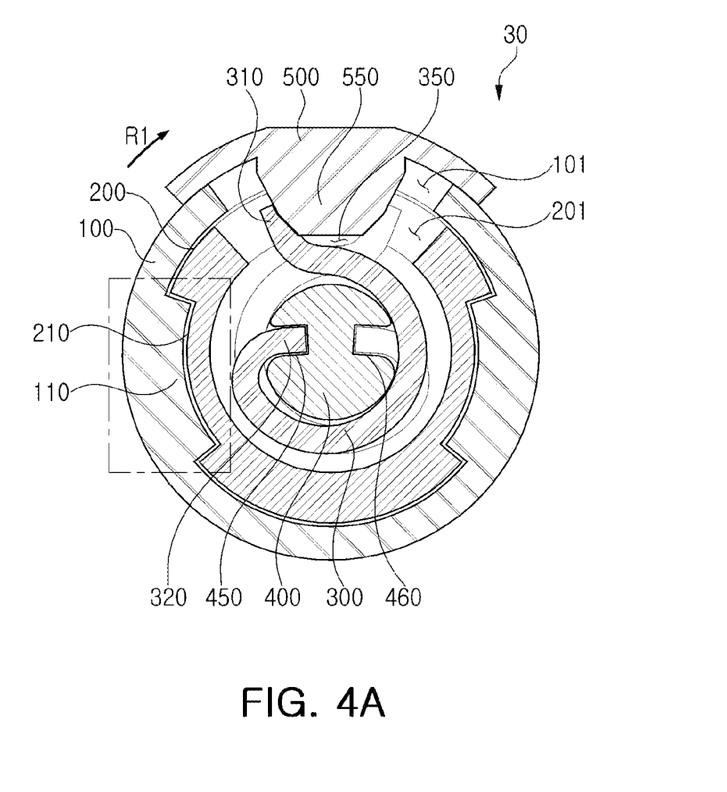
FIG. 4A is a cross-sectional view taken along line B-B' in FIG. 2 according to an embodiment of the present disclosure.
Figure 4B:
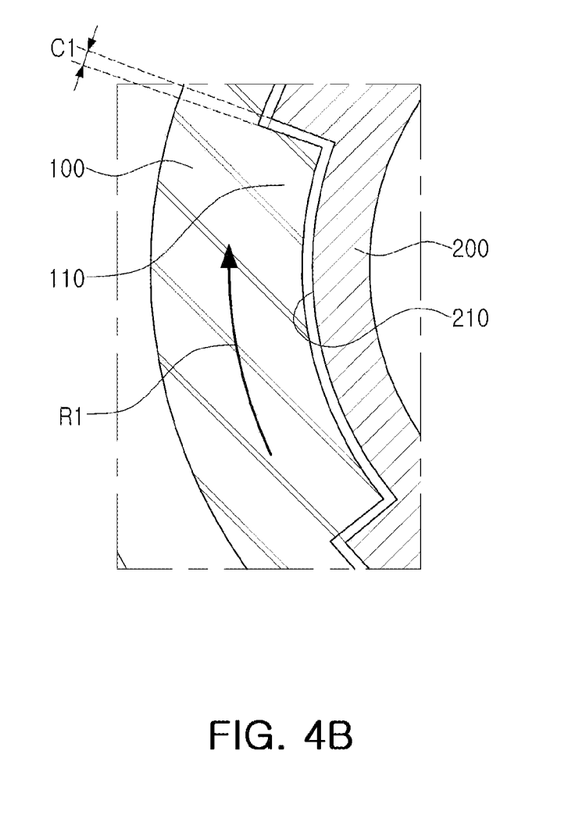
FIG. 4B is an enlarged view of a portion of FIG. 4A according to an embodiment of the present disclosure.
Figure 5:
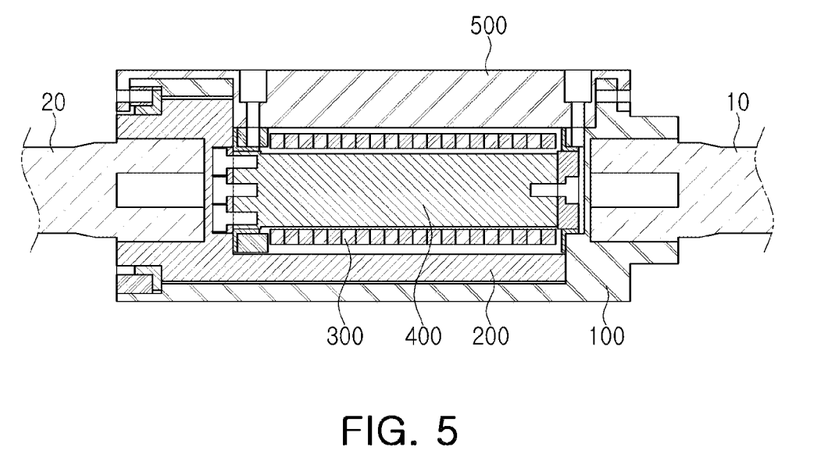
FIG. 5 is a cross-sectional view taken along line C-C' in FIG. 2 according to an embodiment of the present disclosure.

Referring to FIGS. 4A and 4B, the connection mechanism 30 of an embodiment may be formed such that the outer cylinder member 100 protrudes inwardly so that the stoppers 110 face each other on the left and right sides of the inner diameter of the outer cylinder member 100, and a stopper groove 210 may be formed in an outer diameter of the inner cylinder member 200 matching the stopper 110, so that the stopper 110 may be inserted into the stopper groove 210.

A selected, set, or predetermined gap C1 may be formed between one side surface of the stopper 110 and one side surface of the stopper groove 210 in the rotational direction of the outer cylinder member 100, the gap C1 is a structure formed by a length of the stopper groove 210 to be longer than a length of the stopper 110 in the rotational direction (circumferential direction) of the outer cylinder member 100, and the length of the gap C1 may be formed to have a length at which the outer cylinder member 100 may rotate by approximately 1 to 5 degrees, but the present disclosure is not limited thereto, and may be variously applied to an extent necessary depending on the conditions or application environments.

One end of the torsion spring 300 may be directly or indirectly fixed to the outer cylinder member 100, and the other end of the torsion spring 300 may be directly or indirectly coupled to the inner cylinder member 200.

One end of the torsion spring 300 may be directly or indirectly fixed to the outer cylinder member 100 itself, and may be positioned to be pressed by another member fixed to the outer cylinder member 100, such as the compression sheet 500, for example.

The torsion spring 300 may be fixed to the inner cylinder member 200 itself, or to another member coupled to the inner cylinder member 200, such as the shaft 400, for example. An end of a shaft 400 can be fixed to the inner cylinder member 200, and the other end of the torsion spring 300 may be fixed to the shaft 400.

The compression sheet 500 can be coupled to the outer cylinder member 100, and may serve as a cover that presses and covers an outer end of the torsion spring 300 fixed to the inner cylinder member 200.

The inner cylinder member 200 may be provided with a first opening 201 on an upper side thereof so that an outer end 310 of the torsion spring 300 installed in the inner cylinder member 200 is exposed externally, and the first opening 201 may be provided at a substantially similar position to a second opening 101.

The outer cylinder member 100 may be provided with a second opening 101 on an upper side thereof so that an outer end 310 of the torsion spring 300 installed in the inner cylinder member 200 and exposed through the first opening 201 can be exposed externally, and the opening 101 may be covered by the compression sheet 500.

The shaft 400 can be provided to have a length in the longitudinal direction of the inner cylinder member 200, and the torsion spring 300 may be inserted onto the shaft 400 and an inner end, which is one end 320 of the torsion spring 300 may be fixed into the shaft 400. A plurality of torsion springs 300 may be sequentially inserted in a longitudinal direction of the shaft 400, and the outer end 310, which can be the other end of the torsion spring 300, can intersect in an order of being positioned and expand in left and right direction to form a space 350 therebetween in the longitudinal direction. A portion of the compression sheet 500 may be inserted into the space 350 therebetween to press the other end 310 of the torsion spring 300. One torsion spring 300 may implement such a structure described above.

Accordingly, the torsion spring 300 can maintain a preloaded state, and when the outer cylinder member 100 and the inner cylinder member 200 rotate relatively to each other, rotational stiffness (torsional stiffness) may be provided by an elastic force of the torsion spring 300.

The compression sheet 500 may be provided with compression protrusions 550 protruding into the space 350 therebetween, and can maintain a state in which the compression protrusions 550 press the torsion spring 300.

In an embodiment, a structure in which the compression sheet 500 and the compression protrusions 550 are provided integrally is described, but the compression protrusions 550 may be provided as a separate member from the compression sheet 500, and the compression sheet 500 may be assembled to the outer cylinder member 100 while pressing the compression protrusions 550 in a state in which the compression protrusions 550 are placed in the space 350 therebetween formed by the outer protrusions 310 of the torsion spring 300. When the outer cylinder member 100 rotates relatively with the inner cylinder member 200, as the outer protrusions 310 of the torsion spring 300 rotate together with the rotation of the outer cylinder member 100, the elastic force of the torsion spring 300 may be exerted.

The torsion spring 300 in an embodiment may be a spiral spring. The torsion spring 300 may be provided in a ring shape which is coiled (wound) only once or coiled (wound) more than twice, and the torsion spring 300, which is provided integrally or separately, may be inserted into the shaft 400. For convenience of explanation in an example embodiment, only the torsion spring 300 coiled once is shown in the drawings.

The torsion spring 300 of an embodiment may have a substantially circular bent shape, one end of the torsion spring 300 may be directly or indirectly coupled to the outer cylinder member 100, and the other end of the torsion spring 300 may be directly or indirectly fixed or coupled to the inner cylinder member 200.

The torsion spring 300 can be provided between the outer cylinder member 100 and the inner cylinder member 200, which rotate relatively and serves to provide rotational stiffness (torsional stiffness), and at least one end of the torsion spring 300 can be provided to have a rotational degree of freedom to ensure sufficient repeatability and stiffness.

Accordingly, in an embodiment, an inner end, which is one end of the torsion spring 300, may be inserted and fixed to the fixing grooves 450 and 460 in the shaft 400 of the inner cylinder member 200, and an outer end, which is the other end of the torsion spring 300, may be pressed, to have a degree of rotational freedom, by the compression protrusion 550 of the compression sheet 500, which can be fixed and coupled to the outer cylinder member 100.

One or a plurality of torsion springs 300 may be sequentially inserted in the longitudinal direction of the shaft 400, and an outer end, which is the other end of the torsion spring 300, can intersect in an order of being positioned and can expand in the left and right directions to form a space 350 therebetween in the longitudinal direction, and a portion of the compression sheet 500 may be inserted into the space 350 therebetween to press the other end of the torsion spring 300.

Accordingly, the outer end of the torsion spring 300 may have an outer protrusion 310 protruding outwardly in a round shape. The outer end of the torsion spring 300 may be inserted into the shaft 400 so that it intersects in an order in which the outer protrusion 310 is positioned and can expand in left and right directions.

An inner end of the torsion spring 300 may have an inner protrusion 320 bent inwardly from a round shape, and the inner protrusion 320 may be inserted into fixing grooves 450 and 460 of the shaft 400.

Two fixing grooves, a first fixing groove 450 and a second fixing groove 460, may be provided on both sides of the shaft 400 to be elongated in a longitudinal direction. In the drawings, the first fixing groove 450 and the second fixing groove 460 are shown to be elongated in the longitudinal direction of the shaft 400 so that a plurality of torsion springs 300 are inserted thereto, but the first fixing groove 450 and the second fixing groove 460 may be provided as individual holes for each torsion spring 300, for example.

An inner end, which is one end of the torsion spring 300, may intersect in an order of being positioned in a longitudinal direction, and be inserted and fixed to the first fixing groove 450 and the second fixing groove 460, on the left and right sides.

Because the cylindrical inner cylinder member 200 can be inserted into the outer cylinder member 100, and the torsion spring 300 can be fixed and coupled to the shaft 400 fixedly provided in the inner cylinder member 200, the inner cylinder member 200 and the shaft 400 can rotate relatively with the outer cylinder member 100, and the torsion spring 300 can repeat tension and compression in the middle, that is, being pressed inwardly (compression) or expanded outwardly (tension) can be repeated.

The shaft 400 may have bearings 410 (i.e., 410a and 410b) at both ends in a longitudinal direction, and the inner cylinder member 200 may have a bearing 111 between the inner cylinder member 200 and the outer cylinder member 100.

The shaft 400 may further include a fixing ring 420 to be fixed to the inner cylinder member 200, and to close an end of the outer cylinder member 100, a side cover 150 may be provided. A fixing member 430 may be further provided to fix the fixing ring 420 to the inner cylinder member 200.

FIGS. 6A to 6J illustrate an assembly process of a stabilizer bar assembly according to an embodiment of the present disclosure.

Figure 6A:
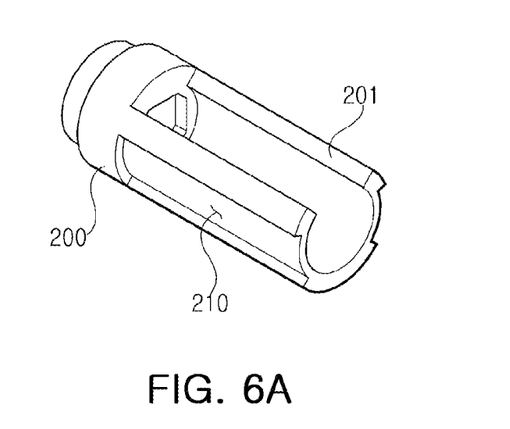
FIGS. 6A, 6B, 6C, 6D, 6E, 6F, 6G, 6H, 6I, and 6J are diagrams illustrating an assembly process of the stabilizer bar assembly according to an embodiment of the present disclosure.
Figure 6B:
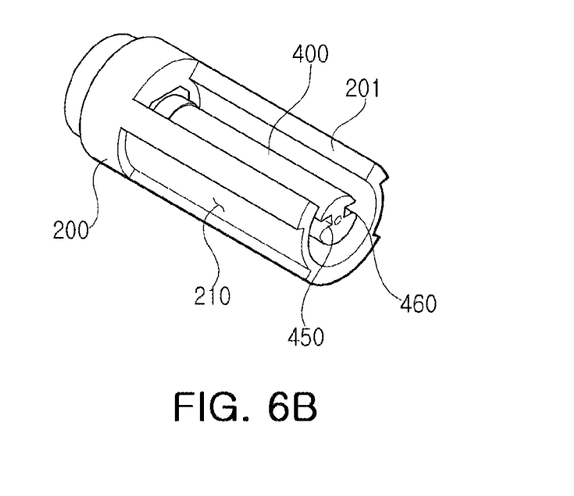
Figure 6C:
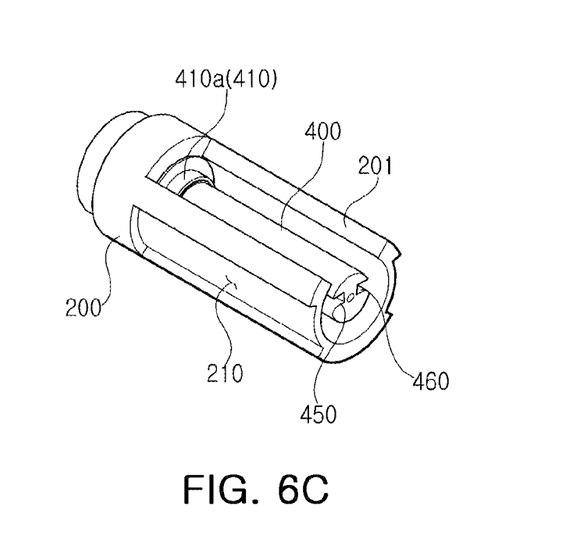
Figure 6D:
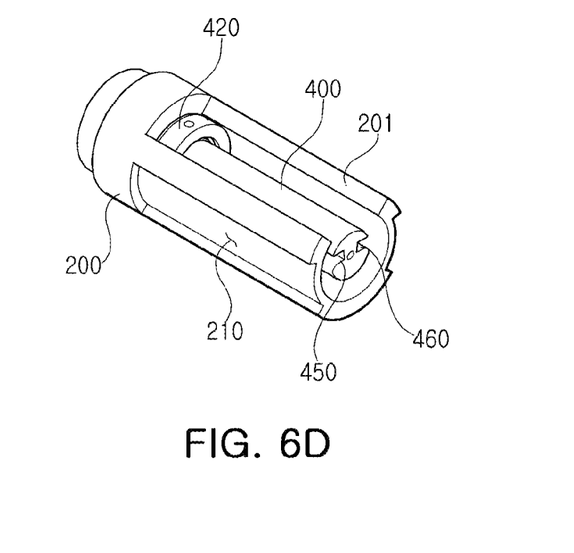
Figure 6E:
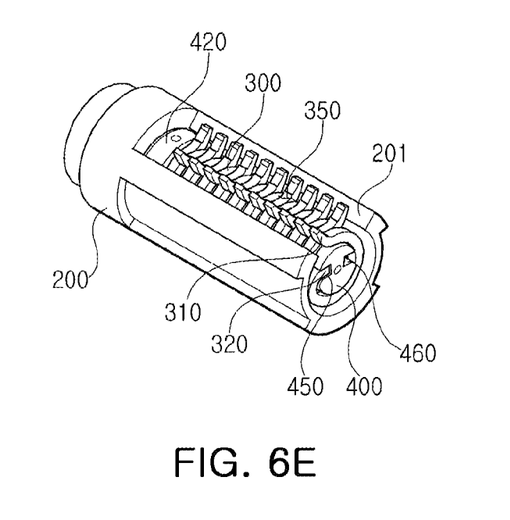
Figure 6F:
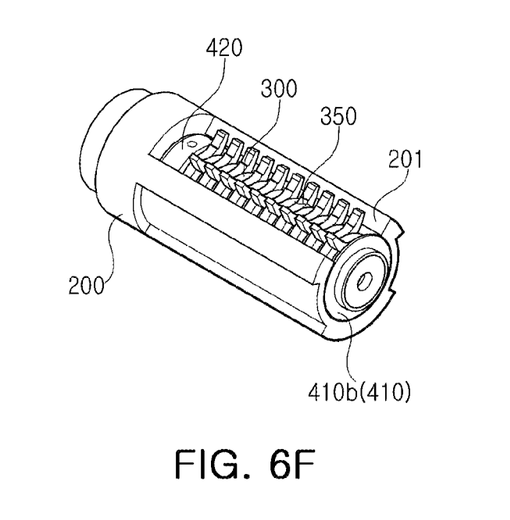
Figure 6G:
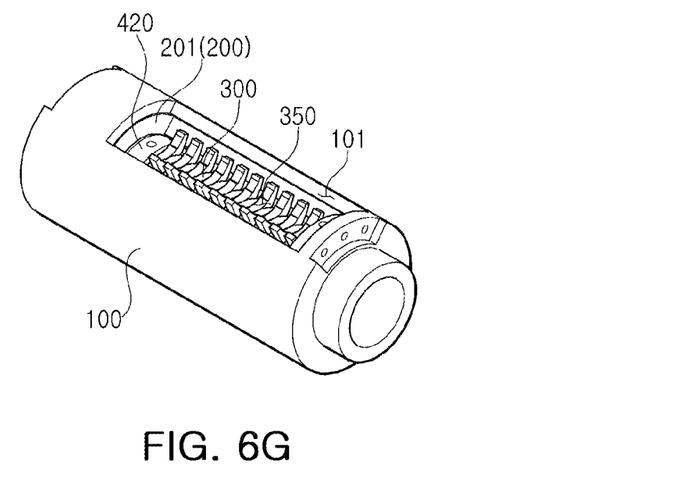
Figure 6H:
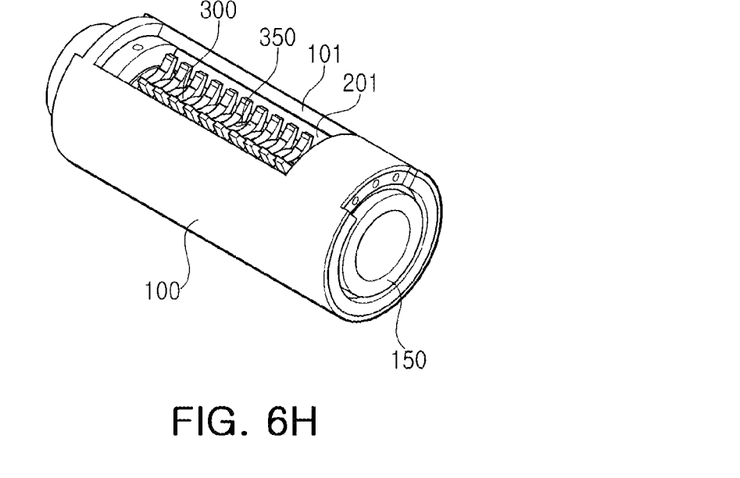

An inner cylinder member 200 can be prepared or provided (FIG. 6A). A shaft 400 having a length in a longitudinal direction can be fixed to an inside of the inner cylinder member 200 (FIG. 6B). Bearing 410a and a fixing ring 420 can be assembled in one end of the shaft 400 to facilitate rotation of a torsion spring 300 to be inserted into the shaft 400 (FIGS. 6C and 6D). An outer end 310 can be alternated and expand left and right sides to form a space 350 therebetween and a plurality of torsion springs 300 can be inserted into the shaft 400 and assembled so that an inner end 320 can be inserted and fixed to the first fixing groove 450 and the second fixing groove 460 on left and right sides (FIG. 6E). Bearing 410b can be assembled at the other end of the shaft 400 (FIG. 6F). An outer cylinder member 100 can be assembled to surround the inner cylinder member 200 (FIG. 6G).

Figure 6I:
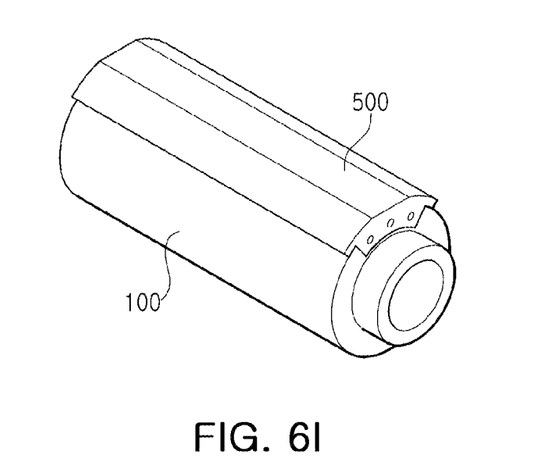
Figure 6J:
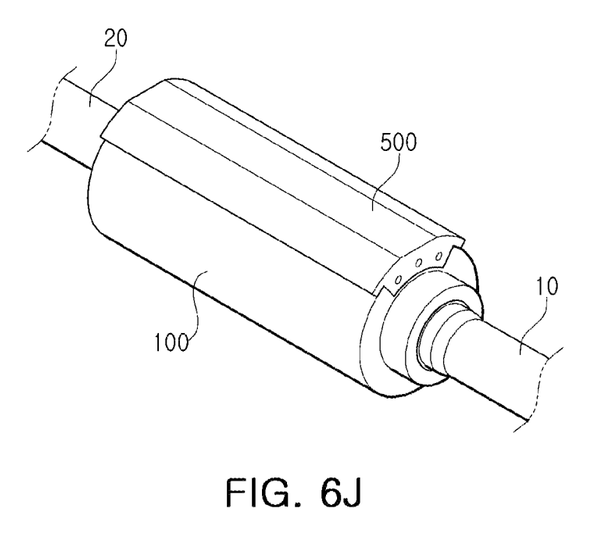

After assembling the side cover 150 (FIG. 6H), a compression sheet 500 can be coupled to the outer cylinder member 100 to complete a connection mechanism 30 so that the compression protrusion 550 can be inserted into the space 350 therebetween and can press outer ends 310 (FIG. 6I). A left bar 10 and a right bar 20 can be coupled to the outer cylinder member 100 and the inner cylinder member 200 to complete a stabilizer bar assembly according to an embodiment of the present disclosure (FIG. 6J).

When a bump or rebound occurs on left and right wheels of the vehicle and the left and right wheels are out of phase with each other, the outer cylinder member 100 can rotate due to torsion of the left bar 10, and the outer cylinder member 100 can rotate until a gap C1 between a stopper 110 and a stopper groove 210 disappears (or until the stopper 110 contacts and engages with the stopper groove 210).

Assuming that the outer cylinder member 100 rotates clockwise (arrow R1) with reference to FIGS. 4A and 4B, as the compression sheet 500 rotates clockwise along with the outer cylinder member 100, outer protrusions 310 of the torsion spring 300 also rotate clockwise, and among the outer protrusions 310, as those located on a left side of the compression protrusion 550 are tensioned outwardly, and those located on a right side thereof are compressed inwardly, primary roll stiffness can be generated by an elastic force of the torsion spring 300, and the vehicle can improve stability when driving straight and improves ride comfort due to the primary roll stiffness exerting relatively weaker force compared to torsion twisting the bars 10 and 20.

When the outer cylinder member 100 continues to rotate after the primary roll stiffness is generated, the gap C1 between the stopper 110 and the stopper groove 210 is eliminated, so that the stopper 110 and the stopper groove 210 contact each other on one side, and when the stopper 110 and the stopper groove 210 contact each other, the compression and tension operations of the torsion spring 300 discontinue changing. From this point in the rotation (after the gap C1 is closed), the rotation of the outer cylinder member 100 can be transmitted to the inner cylinder member 200 by the contact between the stopper 110 and the stopper groove 210, thereby causing torsion of the inner cylinder member 200, and as a result thereof, torsion of the left bar 10 and the right bar 20 occurs and secondary roll stiffness exerting a force greater than the primary roll stiffness can be realized, thereby improving the turning stability of the vehicle.

Figure 7:
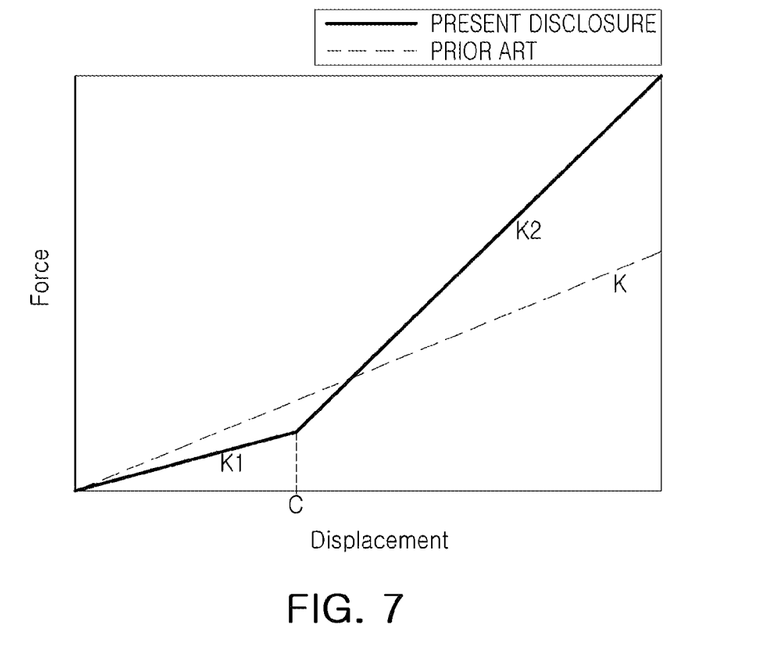
FIG. 7 is a reference graph illustrating a change in roll stiffness of the stabilizer bar assembly according to an embodiment of the present disclosure.

Referring to FIG. 7, a conventional stabilizer bar according to the prior art typically has a same elastic strength (K)

applied to both straight driving and corner driving (one slope). However, the stabilizer bar assembly(S) according to an embodiment may have two elastic strengths, that is, an elastic strength of K1 for straight driving and an elastic strength of K2 for corner driving, depending on the structural characteristics. Accordingly, the primary roll stiffness (K1) and the torsion of the left bar 10 and the right bar 20 can be generated by the inner cylinder member 200, thereby realizing secondary roll stiffness that exerts a force greater than the primary roll stiffness.

In the graph shown in FIG. 7, when the gap C1 between the stopper 110 and the stopper groove 210 of the outer cylinder member 100 and the inner cylinder member 200 shown in FIGS. 4A and 4B increases, an inflection point C may move farther to the right side, and conversely, when the gap C1 therebetween decreases, the inflection point C may move farther to the left side, so that the roll stiffness implemented in the vehicle may be appropriately adjusted by adjusting the gap C1, for example.

As described above, the vehicle stabilizer bar assembly according to an embodiment of the present disclosure may be configured to help improve the turning stability of the vehicle, improve safety when driving straight, and improve ride comfort by generating variable roll stiffness for various type of roll phenomenon that can occur during driving by using only mechanical parts including the outer cylinder member 100, the inner cylinder member 200, and a plurality of torsion springs 300, which can have an advantage of reducing the number of parts and reducing costs as compared to the conventional technology using sensors, actuators, and controllers, for example.

Figure 8:
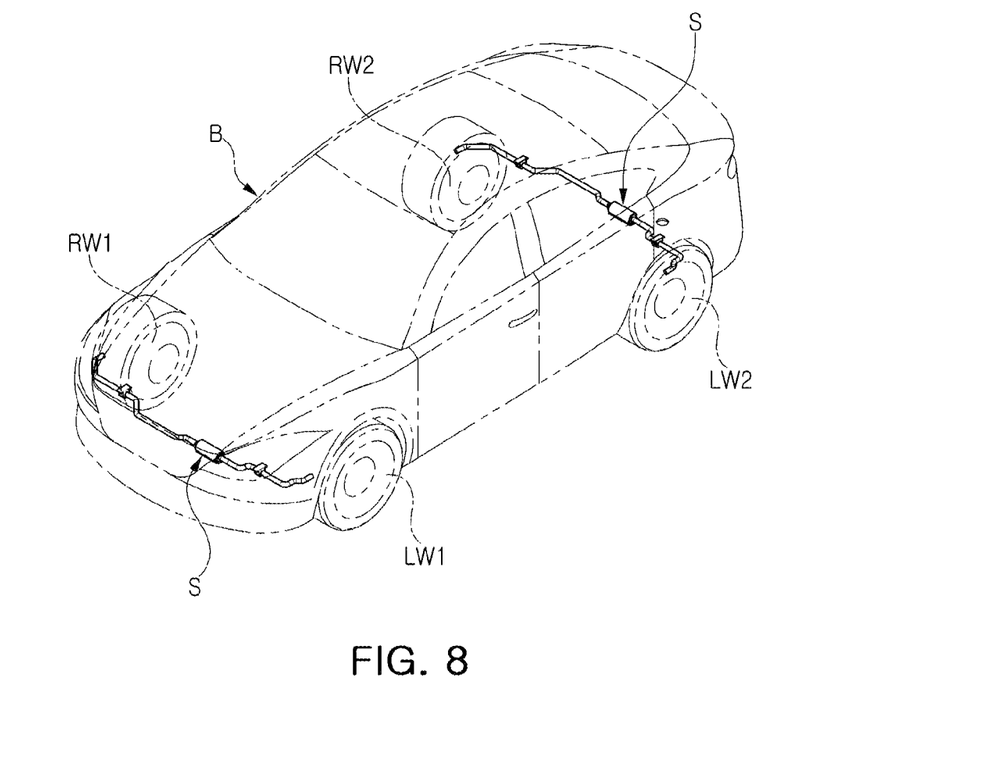
FIG. 8 is a reference diagram illustrating a vehicle on which the stabilizer bar assembly is installed according to an embodiment of the present disclosure.

FIG. 8 is a reference diagram illustrating a vehicle on which a stabilizer bar assembly S is installed according to an embodiment of the present disclosure.

A vehicle 1 according to an embodiment of the present disclosure includes at least a body B, left wheels LW1, LW2, and right wheels RW1, RW2 provided on the body B. In addition, the vehicle 1 of an embodiment may include a stabilizer bar assembly S provided for the left wheels LW1, LW2 and the right wheels RW1, RW2 to improve stability and ride comfort during driving.

The body B can refer to a body of the vehicle, and the left wheels LW1, LW2 and the right wheels RW1, RW2 may be provided to enable driving of the body B.

The stabilizer bar assembly S may be installed as described with reference to FIGS. 1 to 7, and a detailed description of a structure thereof again will be omitted.

When a bump or rebound occurs on the left and right wheels of the vehicle and the left and right wheels are out of phase with each other, an outer cylinder member 100 can rotate due to torsion of a left bar 10, and the outer cylinder member 100 can rotate until a gap C1 between a stopper 110 and a stopper groove 210 is closed.

Assuming that the outer cylinder member 100 rotates clockwise (arrow R1) with reference to FIGS. 4A and 4B, as a compression sheet 500 rotates clockwise along with the outer cylinder member 100, outer protrusions 310 of a torsion spring 300 also rotate clockwise. Those located on a left side of the compression protrusion 550 among the outer protrusions 310, can be tensioned outwardly, and those located on a right side thereof can be compressed inwardly, and primary roll stiffness can be generated by an elastic force of the torsion spring 300, and the stability of the vehicle when driving straight can be improved and riding comfort can be improved, by primary roll stiffness exerting a relatively weaker force (K1).

When the outer cylinder member 100 continues to rotate after the primary roll stiffness is generated, a gap C1 between the stopper 110 and the stopper groove 210 is closed, so that the stopper 110 and the stopper groove 210 can be in contact with each other on one side surface, when the stopper 110 and the stopper groove 210 contact, compression and tension operations of the torsion spring 300 stops changing, and from this point, the rotation of the outer cylinder member 100 can be transferred to an inner cylinder member 200 by contact between the stopper 110 and the stopper groove 210, causing torsion of the inner cylinder member 200, thereby implementing secondary roll stiffness exerting a force (K2), greater than the primary roll stiffness (K1), thereby improving turning stability of the vehicle.

As set forth above, a stabilizer bar assembly for a vehicle can generate variable roll stiffness for various types of roll phenomena that can be occurring during driving by using only mechanical parts, thereby improving turning stability of the vehicle, improving safety when driving straight, and improving ride comfort, for example.

The stabilizer bar assembly according to an embodiment of the present disclosure can reduce the number of parts and reduce costs as compared to the prior art systems using sensors, actuators, and controllers, for example.

While the example embodiment has been illustrated and described above, it can be apparent to those skilled in the art that modifications, equivalents, and variations can be made without departing from the scope of the present disclosure as defined by the appended claims.

What is claimed is:

1. A stabilizer bar assembly, comprising:
   a left bar;
   a right bar;
   an outer cylinder member connected to a first one of the left bar and the right bar;
   an inner cylinder member provided inside the outer cylinder member and configured to enable relative rotation with the outer cylinder member, and the inner cylinder member being connected to the other one of the left bar and the right bar; and
   a torsion spring configured to provide rotational stiffness to the inner cylinder member relative to the outer cylinder member.

2. The stabilizer bar assembly of claim 1, wherein the torsion spring has a first end directly or indirectly coupled to the outer cylinder member and wherein the torsion spring has a second end directly or indirectly fixed to the inner cylinder member.

3. The stabilizer bar assembly of claim 2, further comprising a shaft fixed to the inner cylinder member, wherein the second end of the torsion spring is fixed to the shaft.

4. The stabilizer bar assembly of claim 2, further comprising a compression sheet fixed to the outer cylinder member, wherein the first end of the torsion spring is pressed by the compression sheet.

5. The stabilizer bar assembly of claim 1, further comprising:
   a stopper protruding inwardly from an inner diameter of the outer cylinder member; and
   a stopper groove provided in an outer diameter of the inner cylinder member, wherein the stopper is inserted into the stopper groove.

6. The stabilizer bar assembly of claim 5, wherein the stopper and the stopper groove are configured such that the stopper is caught by the stopper groove due to the relative rotation between the inner cylinder member and the outer cylinder member, and such that a rotational force between the outer cylinder member and the inner cylinder member is transmitted via contact of the stopper with the stopper groove.

7. The stabilizer bar assembly of claim 5, wherein a first gap is between a stopper side surface of the stopper and a stopper groove side surface of the stopper groove in a rotational direction.

8. The stabilizer bar assembly of claim 1, further comprising:
   a compression sheet fixed to the outer cylinder member and by which a first end of the torsion spring is engaged; and
   a shaft fixed to the inner cylinder member and to which a second end of the torsion spring is fixed.

9. The stabilizer bar assembly of claim 8, wherein the shaft is configured to have a length in a longitudinal direction of the inner cylinder member, and wherein the first end of the torsion spring is inserted into the shaft.

10. The stabilizer bar assembly of claim 9, wherein the torsion spring comprises a plurality of torsion spring portions that are sequentially inserted along the longitudinal direction of the shaft,
   wherein the first end of the torsion spring comprises a set of outer ends of the plurality of torsion spring portions,
   wherein the set of the outer ends of the plurality of torsion spring portions intersect each other and extend in alternating left and right directions to form a space therebetween the set of the outer ends along the longitudinal direction, and
   wherein a portion of the compression sheet is inserted into the space therebetween the set of the outer ends to engage the first end of the torsion spring.

11. The stabilizer bar assembly of claim 10, wherein the compression sheet has a compression protrusion extending therefrom, and wherein the compression protrusion protrudes into the space therebetween the set of the outer ends, such that the compression protrusion engages the set of the outer ends.

12. The stabilizer bar assembly of claim 1, wherein the stabilizer bar assembly is configured such that as the outer cylinder member and the inner cylinder member initially rotate relative to each other, the torsion spring generates a primary roll stiffness due to elasticity of the torsion spring.

13. The stabilizer bar assembly of claim 12, wherein the stabilizer bar assembly is configured such that after the outer cylinder member and the inner cylinder member initially rotate relative to each other and as the outer cylinder member and the inner cylinder member continue to rotate relative to each other beyond a transition rotation point, torsion of the left and right bars generates a secondary roll stiffness, wherein the secondary roll stiffness is greater than the primary roll stiffness.

14. The stabilizer bar assembly of claim 1, further comprising:
   a stopper of the outer cylinder member; and
   a stopper groove in an outer diameter of the inner cylinder member, wherein the stopper is inserted into the stopper groove, and wherein the stabilizer bar assembly is configured such that as the outer cylinder member and the inner cylinder member rotate relative to each other, the torsion spring generates a primary roll stiffness at least until a first gap between a stopper side surface of the stopper and a stopper groove side surface of the stopper groove is closed.

15. The stabilizer bar assembly of claim 14, wherein the stabilizer bar assembly is configured such that after the stopper side surface of the stopper contacts the stopper groove side surface of the stopper groove and the first gap is closed, through continued rotation of the outer cylinder member and the inner cylinder member relative to each other, a secondary roll stiffness greater than the primary roll stiffness is implemented by torsion of the left bar and the right bar.

16. A stabilizer bar assembly for a vehicle, comprising:
   a first bar extending along a first partial width of the vehicle;
   a second bar extending along a second partial width of the vehicle;
   an outer cylinder member rotationally fixed to the first bar;
   an inner cylinder member rotationally fixed to the second bar, wherein at least part of the inner cylinder member extends within the outer cylinder member;
   a torsion spring member having a first end rotationally fixed to the inner cylinder member, and the torsion spring member having a second end configured to engage the outer cylinder member, wherein the torsion spring member is configured to provide spring force between the inner cylinder member and the outer cylinder member;
   a first rotation stopper on the outer cylinder member; and
   a second rotational stopper on the inner cylinder member, wherein the stabilizer bar assembly is configured such that as the outer cylinder member and inner cylinder member initially rotate relative to each other, the torsion spring member generates a primary roll stiffness due to elasticity of the torsion spring member, and wherein the stabilizer bar assembly is configured such that after the outer cylinder member and the inner cylinder member initially rotate relative to each other and as the outer cylinder member and the inner cylinder member continue to rotate relative to each other beyond a transition rotation point at which the first rotation stopper engages the second rotational stopper, torsion of the first and second bars generates a secondary roll stiffness, wherein the secondary roll stiffness is greater than the primary roll stiffness.

17. The stabilizer bar assembly of claim 16, wherein the torsion spring member comprises:
   a first set of torsion springs arranged in a first orientation;
   a second set of torsion springs arranged in a second orientation, wherein the first orientation is opposite of the second orientation, and wherein the first set of torsion springs are alternated with and interleaved with the second set of torsion springs along a width direction of the vehicle; and
   a protrusion member extending along the width direction of the vehicle between the first set of torsion springs and the second set of torsion springs.

18. The assembly of claim 17, wherein the first rotation stopper extends inward towards the inner cylinder member from an inner surface of the outer cylinder member, and wherein the second rotational stopper is a stopper groove in an outer surface of the inner cylinder member, and wherein the first rotational stopper is inserted into the stopper groove of the second rotational stopper.

* * * * *